United States Patent Office 3,547,974
Patented Dec. 15, 1970

3,547,974
AROMATIC PROPYLAMINO CYANO COMPOUNDS
Franz Troxler, Bottmingen, and Fritz Seemann, Basel, Switzerland, assignors to Sandoz Ltd. (also known as Sandoz AG), Basel, Switzerland
No Drawing. Filed June 3, 1968, Ser. No. 733,795
Claims priority, application Switzerland, June 5, 1967, 7,925/67
Int. Cl. C07c *121/52, 121/60*
U.S. Cl. 260—465                                       3 Claims

ABSTRACT OF THE DISCLOSURE

The invention provides compounds of formula:

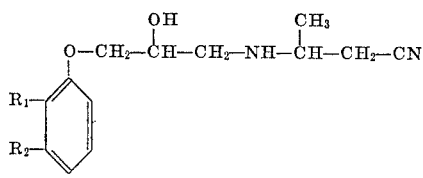

wherein each of $R_1$ and $R_2$ is chlorine, or $R_1$ and $R_2$ together are tetramethylene, and a pharmaceutically acceptable acid addition salt thereof.

The compounds are useful for inhibiting the increase of heart frequency and the cardiac contractile power produced by adrenergic stimulants.

---

The present invention relates to new cyano derivatives and to a process for the production thereof.

The present invention provides cyano derivatives of Formula I,

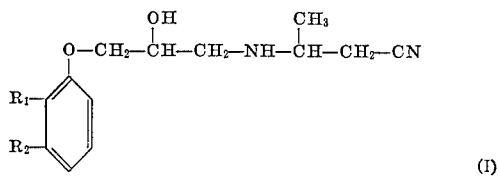

(I)

in which each of $R_1$ and $R_2$ signifies chlorine, or together they signify a tetramethylene chain,
and their salts with inorganic or organic acids. The compounds of the invention include stereoisomeric forms as well as mixtures thereof.

A compound of Formula I or an acid addition salt thereof may, in accordance with the invention, be obtained by reacting in alkaline medium, a phenol derivative of Formula II,

(II)

in which $R_1$ and $R_2$ have the above significance,
with a compound of Formula III,

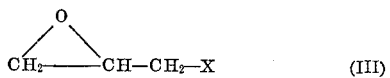

(III)

in which X signifies chlorine or bromine, and
heating the reaction product with 3-aminobutyronitrile,
and when an acid addition salt is required, the resulting compound is reacted with an inorganic or organic acid.

The invention is described in more detail below.

The phenol derivatives of Formula II used as starting materials for the process of the invention are 2,3-dichlorophenol and 5,6,7,8-tetrahydro-1-naphthol. They are used in the form of alkali metal or ammonuim salts, preferably as sodium salts. For example the compound of Formula II may be added to an equimolar aqueous alkali hydroxide or ammonia solution, or may be reacted in an inert organic solvent, e.g. benzene or toluene, with an equimolar amount of an alkali metal alcoholate, amide or hydride. Alternatively, an alcoholic solution of an alkali metal salt of the compound of Formula II may be evaporated to dryness and the residue suspended in an inert organic solvent, e.g. dimethoxy ethane. 1 to 5 equivalents of a compound of Formula III, e.g. epichlorhydrin, may then be added to the resulting solution or suspension, and the mixture stirred at room temperature for an extended period, e.g. 24 hours. The phenol derivatives II are sensitive to oxidation in an alkaline medium, so that the reactions described above are preferably effected in the absence of oxygen, e.g. in an atmosphere of nitrogen.

For purposes of working up, the reaction mixture may be shaken out several times with water and a water-immiscible organic solvent, e.g. methylene chloride, and the organic phases separated, combined, dried (e.g. over magnesium sulphate) and concentrated by evaporation. The product obtained as residue may be worked up directly without previous purification.

The reaction of the reaction product obtained above with 3-aminobutyronitrile is preferably effected in an organic solvent which is inert under the reaction conditions, e.g. benzene, toluene, dioxane, and has a duration of about 2 to 20 hours. The reaction may be effected at a temperature of between 50 and 120° C., but is preferably effected at the boiling temperature of the solution and under reflux. The addition of an acid-binding agent, e.g. an inorganic base, e.g. potassium carbonate, a tertiary organic base, e.g. pyridine or triethylamine, or a second mol of 3-aminobutyronitrile, is advantageous but not essential.

After the reaction is completed, the reaction mixture may be concentrated by evaporation, the residue shaken out between an aqueous acid, e.g. 1 N tartaric acid solution, and an organic solvent which is immiscible with the acid, e.g. ether, the acid aqueous phase made alkaline (e.g. with an aqueous alkali hydroxide solution), the liberated basic products taken up in a suitable organic solvent, e.g. methylene chloride, and the separated and dried organic phase finally concentrated by evaporation at reduced pressure. The crude product obtained as residue may subsequently be purified in manner known per se, e.g. by crystallization, adsorption chromatography or salt formation.

The compounds of Formula I produced in accordance with the invention are basic substances which are practically insoluble in water, but usually fairly or readily soluble in most organic solvents and in aqueous solutions of inorganic or organic acids. With inorganic acids, e.g. hydrochloric, hydrobromic, sulphuric acid, or with organic acids, e.g. fumaric, maleic, tartaric, methane-, ethane- or p-toluenesulphonic acid, or N-cyclohexylsulphamic acid, they form stable salts which are usually water-soluble, the production of which also is included in the present invention.

The compounds are useful because they possess pharmacological activity in animals. In particular, the compounds are useful in the treatment or prophylaxis of heart diseases in warm-blooded animals, particularly coronary insufficiency and cardiac arrhythmia as indicated by the inhibition of adrenalin or isoproterenol induced adrenergic stimulation in situ and standard in vitro tests on isolated guinea pig auricle.

Standard methods of administration in therapy may be employed. Thus, the compounds I or their water-soluble, physiologically tolerable acid addition salts may be used on their own or in the form of appropriate medicinal preparations, such as tablets, dragées, suppositories or injectable solutions. Aside from the usual inorganic or organic, pharmaceutically inert adjuvants, such as lactose, starch, talcum, stearic acid, water, alcohols, natural or hardened oils and waxes, these preparations may also contain suitable preserving, stabilizing or wetting agents, solubilizers, sweetening or coloring substances and flavorings.

For the above use, the dosage administered will, of course, vary depending upon the particular compound employed. However, in general, satisfactory results are obtained when administered at a daily dose of from about 0.05 mg./kg. to about 3 mg./kg. animal body weight. For large mammals, the daily dosage is in the range of from 1 mg. to about 500 mg. and is preferably administered in divided doses 2 to 4 times a day. Suitable dosage forms comprise from about 0.5 mg. to about 125 mg. of the compound in intimate admixture with a pharmaceutical carrier or diluent.

The term "in manner known per se" as used herein designates methods in use or described in the literature on the subject.

In the following non-limitative examples all temperatures are indicated in degrees centigrade and are not corrected.

EXAMPLE 1

1-[3-(1-cyano-2-propylamino)-2-hydroxypropoxy]-2,3-dichlorobenzene 16.3 g. of 2,3-dichlorophenol and subsequently 10 cc. of epichlorhydrin are added while stirring in an atmosphere of nitrogen to a solution of 4 g. of sodium hydroxide in 100 cc. of water. The reaction mixture is stirred at room temperature for a further 24 hours, is extracted four times with methylene chloride and the combined organic phases which have been dried over magnesium sulphate are concentrated by evaporation at reduced pressure. 18.2 g. of the oily residue are taken up in 100 cc. of dioxane and heated to the boil at reflux for 8 hours together with 16.8 g. of 3-aminobutyronitrile. The reaction mixture is subsequently evaporated to dryness at reduced pressure and the residue is shaken out thrice between ether and a 1 N aqueous tartaric acid solution; 5 N caustic soda solution is added to the combined tartaric acid phases until an alkaline reaction is obtained and extraction is effected several times with methylene chloride. The organic phases are separated, combined, dried over magnesium sulphate and concentrated by evaporation at reduced pressure; the crude product obtained as oily residue is crystallized with benzene, whereby 1-[3-(1-cyano-2-propylamino) - 2 - hydroxypropoxy]-2,3-dichlorobenzene is obtained in druses having a melting point of 101–104°.

EXAMPLE 2

1-[3-(1-cyano-2-propylamino)-2-hydroxypropoxy]-5,6,7,8-tetrahydronaphthalene

This compound is obtained in a manner analogous to that described in Example 1 from 4 g. of sodium hydroxide in 100 cc. of water, 14.8 g. of 5,6,7,8-tetrahydro-1-naphthol, 10 cc. of epichlorohydrin and 16.8 g. of 3-aminobutyronitrile in 100 cc. of dioxane. The compound indicated in the heading is obtained in the form of an oil and is converted into its hydrogen meleate, which crystallizes from acetone/ethyl acetate in prisms having a melting point of 128–130°.

EXAMPLE 3

| Galenical preparation: | Tablets, g. |
|---|---|
| 1-[3-(1-cyano - 2 - propylamino)-2-hydroxypropoxy]-2,3-dichlorobenzene (compound of Example 1) | 0.010 |
| Magnesium stearate | 0.001 |
| Polyvinyl pyrrolidone | 0.004 |
| Talcum | 0.005 |
| Maize starch | 0.010 |
| Lactose | 0.128 |
| Dimethyl silicone oil | 0.0005 |
| Polyethylene glycol 6000 | 0.0015 |
| For a tablet of | 0.160 |

What is claimed is:
1. A compound of the formula:

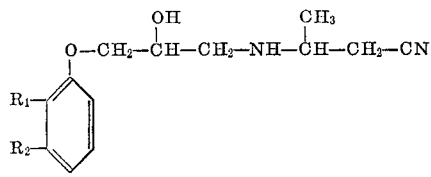

wherein each of $R_1$ and $R_2$ is chlorine, or $R_1$ and $R_2$ together are tetramethylene, and a pharmaceutically acceptable acid addition salt thereof.

2. A compound according to claim 1, which is 1-[3-(1-cyano-2-propylamino) - 2-hydroxypropoxy]-2,3-dichlorobenzene.

3. A compound according to claim 1, which is 1-[3-(1-cyano-2-propylamino) - 2-hydroxypropoxy]-5,6,7,8-tetrahydronaphthalene.

References Cited

UNITED STATES PATENTS

| 3,192,253 | 6/1965 | Boscott et al. | 260—465EX |
| 3,459,782 | 8/1969 | Koppe et al. | 260—465E |

CHARLES B. PARKER, Primary Examiner

C. F. WARREN, Assistant Examiner

U.S. Cl. X.R.

424—304